(12) United States Patent
Lee

(10) Patent No.: US 11,060,688 B1
(45) Date of Patent: Jul. 13, 2021

(54) HIDDEN LIGHT APPARATUS FOR VEHICLE HAVING A GRILLE WITH GRID AND PERFORATED GRID PANEL

(71) Applicants: Hyundai Motor Company, Seoul (KR); Kia Motors Corporation, Seoul (KR)

(72) Inventor: Soon Il Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/083,378

(22) Filed: Oct. 29, 2020

(30) Foreign Application Priority Data

May 8, 2020 (KR) .......................... 10-2020-0054827

(51) Int. Cl.
*F21S 41/50* (2018.01)
*F21S 41/33* (2018.01)
*F21S 41/265* (2018.01)
*F21S 41/64* (2018.01)

(52) U.S. Cl.
CPC ............. *F21S 41/50* (2018.01); *F21S 41/265* (2018.01); *F21S 41/336* (2018.01); *F21S 41/645* (2018.01)

(58) Field of Classification Search
CPC ............................ F21S 41/50; F21W 2104/00

USPC ......................................................... 362/459
See application file for complete search history.

(56) References Cited

U.S. PATENT DOCUMENTS

| 10,059,256 B1 | 8/2018 | Diedrich |
| 10,214,140 B2* | 2/2019 | Belcher .................. B60R 19/52 |
| 10,627,092 B2* | 4/2020 | Brown .................. F21S 41/153 |

FOREIGN PATENT DOCUMENTS

KR  10-2017-0062405 A  6/2017

* cited by examiner

*Primary Examiner* — Robert J May
(74) *Attorney, Agent, or Firm* — Mintz Levin Cohn Ferris Glovsky and Popeo, P.C.; Peter F. Corless

(57) ABSTRACT

A hidden light apparatus for a vehicle is configured so that light is emitted from a grill of the vehicle in a same appearance as a shape of the grill when light is not emitted, thereby maintaining a design of the grill. The hidden light apparatus includes the grill which has an outer surface formed of a pattern composed of a plurality of grids; a grid panel which is coupled to one of the grids in a same shape to form a surface of the one grid, and formed with a perforated hole and anon-perforated portion; and an optical module which is provided inside the grid panel, allows the grid panel to configure the pattern of the grill when turned off, and allows the grid panel to serve as lighting of a vehicle by emitting light through the perforated hole of the grid panel when turned on.

11 Claims, 10 Drawing Sheets

FIG. 7

| POINT | TARGET VALUE(MIN) | TARGET VALUE(MAX) | MEASUREMENT VALUE(cd) | |
|---|---|---|---|---|
| 10U-5L | 80 | 1200 | 140.457 | |
| 10U-V | 80 | 1200 | 152.033 | |
| 10U-5R | 80 | 1200 | 142.964 | |
| 5U-20L | 40 | 1200 | 94.053 | |
| 5U-10L | 80 | 1200 | 230.495 | |
| 5U-V | 280 | 1200 | 311.403 | |
| 5U-10R | 80 | 1200 | 218.267 | |
| 5U-20R | 40 | 1200 | 81.162 | |
| H-20L | 100 | 1200 | 122.707 | |
| H-10L | 280 | 1200 | 315.988 | |
| H-5L | 360 | 1200 | 402.399 | |
| HV | 400 | 1200 | 424.918 | |
| H-5R | 360 | 1200 | 380.490 | |
| H-10R | 280 | 1200 | 288.476 | |
| H-20R | 100 | 1200 | (98.373) | DISSATISFACTION |
| 5D-20L | 40 | 1200 | 89.793 | |
| 5D-10L | 80 | 1200 | 220.000 | |
| 5D-V | 280 | 1200 | 294.080 | |
| 5D-10R | 80 | 1200 | 208.281 | |
| 5D-20R | 40 | 1200 | 84.301 | |

FIG. 8

| POINT | TARGET VALUE(MIN) | TARGET VALUE(MAX) | MEASUREMENT VALUE(cd) |
|---|---|---|---|
| 10U-5L | 80 | 1200 | 160.083 |
| 10U-V | 80 | 1200 | 172.719 |
| 10U-5R | 80 | 1200 | 163.548 |
| 5U-20L | 40 | 1200 | 107.992 |
| 5U-10L | 80 | 1200 | 264.631 |
| 5U-V | 280 | 1200 | 358.990 |
| 5U-10R | 80 | 1200 | 249.958 |
| 5U-20R | 40 | 1200 | 89.019 |
| H-20L | 100 | 1200 | 141.680 |
| H-10L | 280 | 1200 | 352.264 |
| H-5L | 360 | 1200 | 434.395 |
| HV | 400 | 1200 | 455.692 |
| H-5R | 360 | 1200 | 407.494 |
| H-10R | 280 | 1200 | 308.040 |
| H-20R | 100 | 1200 | 107.126 |
| 5D-20L | 40 | 1200 | 103.682 |
| 5D-10L | 80 | 1200 | 251.283 |
| 5D-V | 280 | 1200 | 335.145 |
| 5D-10R | 80 | 1200 | 235.794 |
| 5D-20R | 40 | 1200 | 92.412 |

FIG. 9

| POINT | TARGET VALUE(MIN) | TARGET VALUE(MAX) | MEASUREMENT VALUE(cd) |
|---|---|---|---|
| 10U-5L | 80 | 1200 | 138.912 |
| 10U-V | 80 | 1200 | 149.206 |
| 10U-5R | 80 | 1200 | 141.611 |
| 5U-20L | 40 | 1200 | 90.043 |
| 5U-10L | 80 | 1200 | 224.159 |
| 5U-V | 280 | 1200 | 320.598 |
| 5U-10R | 80 | 1200 | 237.150 |
| 5U-20R | 40 | 1200 | 93.441 |
| H-20L | 100 | 1200 | 114.927 |
| H-10L | 280 | 1200 | 302.209 |
| H-5L | 360 | 1200 | 391.853 |
| HV | 400 | 1200 | 433.726 |
| H-5R | 360 | 1200 | 406.943 |
| H-10R | 280 | 1200 | 318.099 |
| H-20R | 100 | 1200 | 122.523 |
| 5D-20L | 40 | 1200 | 105.034 |
| 5D-10L | 80 | 1200 | 247.944 |
| 5D-V | 280 | 1200 | 338.486 |
| 5D-10R | 80 | 1200 | 252.940 |
| 5D-20R | 40 | 1200 | 99.637 |

HIDDEN LIGHT APPARATUS FOR VEHICLE HAVING A GRILLE WITH GRID AND PERFORATED GRID PANEL

CROSS REFERENCE TO RELATED APPLICATION

The present application claims under 35 U.S.C. § 119(a) the benefit of Korean Patent Application No. 10-2020-0054827 filed on May 8, 2020, the entire contents of which are incorporated by reference herein.

BACKGROUND

(a) Technical Field

The present disclosure relates to a hidden light apparatus through which light is emitted from a grill of a vehicle.

(b) Description of the Related Art

Generally, a vehicle has one or more lamps (exterior lights) for making it possible to see objects in a traveling direction during night driving and for notifying other vehicles or other road users of a traveling state of the vehicle. For example, every vehicle is provided with headlights (each of which is also referred to as a lamp or headlamp), which function to illuminate the road ahead of the vehicle.

A lamp mounted on a vehicle may be classified into a head lamp, a fog light, a turn indicator light, a brake light, and a rear light, and a direction of emitting light to the road surface is set differently depending on the type of exterior light.

Such a vehicle lamp typically can be used to identify objects by emitting light from a light bulb arranged in a forward direction, but recently, a light guide may be provided to improve exterior design so that the light is emitted with a specific image.

However, as a vehicle has limited space for accommodating a lamp such as the head lamp and the rear lamp, and information is not exchanged using the lamp, and there are limitations from the perspective of utility and design of conventional lamps.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a hidden light apparatus, which is configured so that light is emitted from a grill of a vehicle in a same appearance as a shape of the grill when the light is not emitted, thereby maintaining a design of the grill.

A hidden light apparatus for a vehicle according to the present disclosure includes: a grill which has the outer surface formed of a pattern composed of a plurality of grids, a grid panel which is coupled to one of the grids in a same shape to form a surface of the one grid, configured on some or all of the plurality of grids, and formed with a perforated hole of a region opened to an inside and an outside and a non-perforated portion which is a region not opened, and an optical module which is provided inside the grid panel, allows the grid panel to configure the pattern of the grill when turned off, and allows the grid panel to serve as lighting of the vehicle by emitting light through the perforated hole of the grid panel when turned on.

The grill may be composed of a plurality of grid panels having the same pattern shapes, and optical modules may be provided on some of the grid panels or all of the grid panels among the plurality of grid panels, respectively.

The grid panel may be composed of a plurality of emitting regions forming grid shapes.

The pattern of the grill and the shape of an emitting region of the optical module may be rhombus shapes.

The grid panel may be composed of a plurality of emitting regions forming grid shapes, and the emitting regions may be each composed of a perforated hole and a non-perforated portion.

The light of the optical module may be emitted to the outside through the perforated hole formed in the emitting region, and the total area of the perforated hole may be formed to exceed at least ½ of the total area of the emitting region.

The perforated hole may be 60% or more of the total area of the emitting region.

The perforated hole may be located at the upper side of the emitting region, and the non-perforated portion through which light is not transmitted may be formed at the lower side of the emitting region.

The pattern of the grill and the shape of the emitting region of the optical module may be rhombus shapes, the perforated hole may be formed in a pentagonal shape by being formed to exceed at least ½ of the total area of the emitting region, and the non-perforated portion may be formed in a triangular shape according to the remaining area of the emitting region.

The optical module may be composed of a light source portion which emits light, a reflector portion which reflects light of the light source portion, and a lens portion which forms an emitting region through which the light reflected through the reflector portion is emitted to the outside and is formed to have the same shape as the pattern of the grill.

A plurality of optical modules may be provided on the grill, and turned on/off individually.

The hidden light apparatus having the aforementioned structure is configured so that light is emitted from a grill of a vehicle in a same appearance as a shape of the grill when the light is not emitted, thereby maintaining the design of the grill.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 7 to 9 are tables showing the result of a light distribution efficiency experiment when an area of a perforated hole is less than 50% of an entire area of a light emitting area, when an area of the perforated hole is 60% or more of the entire area of the light emitting area, and when the area of the perforated hole is 60% or more in a state positioned at an upper side of the light emitting area, respectively.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a hidden light apparatus according to a preferred exemplary embodiment of the present disclosure will be described with reference to the accompanying drawings.

Figure 1:
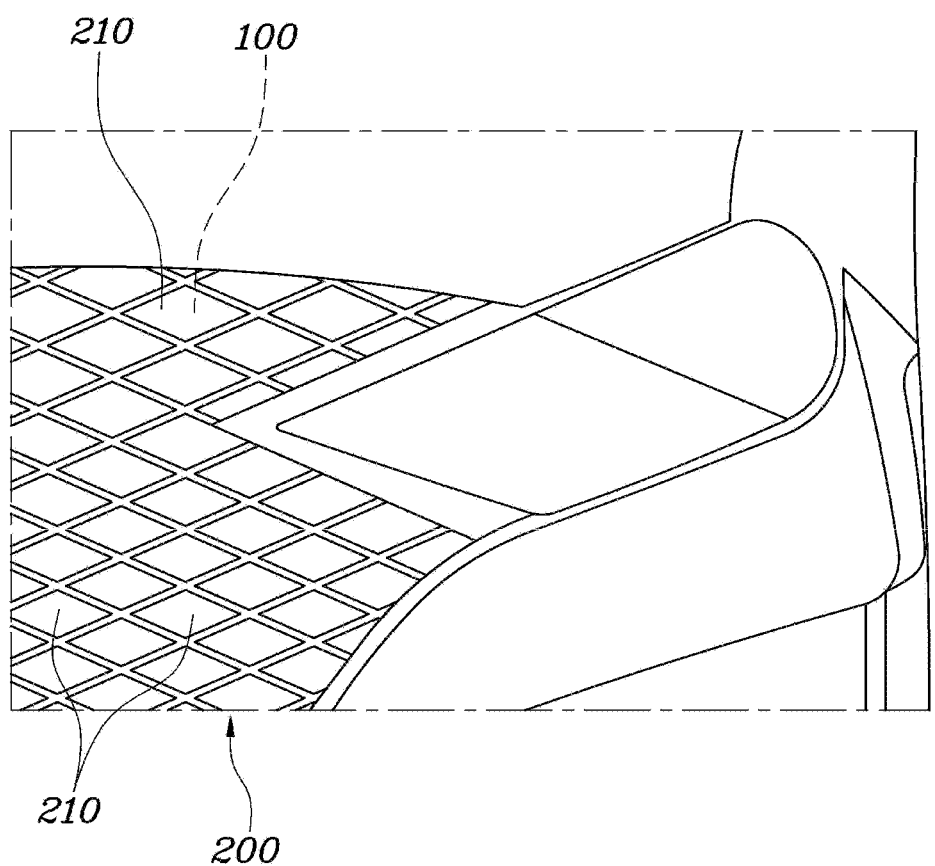
FIG. 1 is a diagram illustrating a hidden light apparatus according to an exemplary embodiment of the present disclosure.
Figure 10:
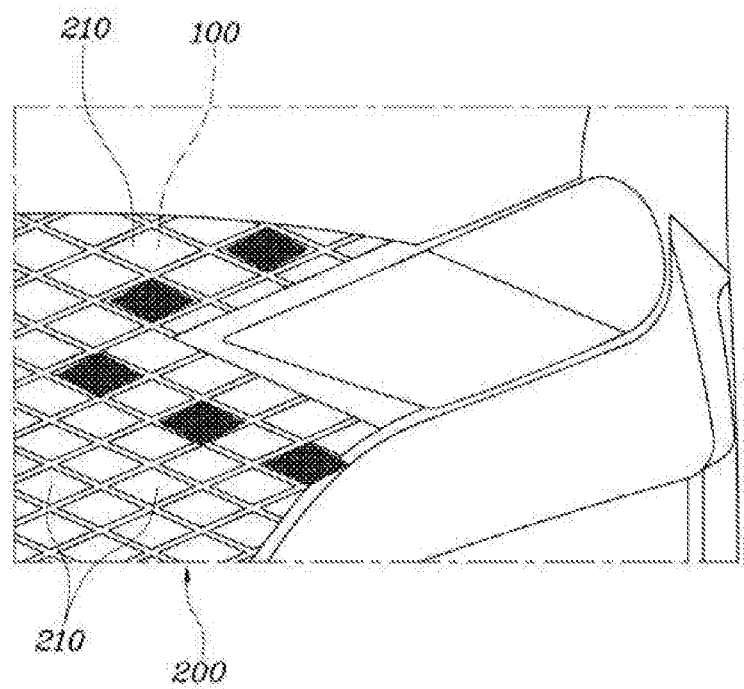
FIGS. 10 and 11 are diagrams illustrating message transfer through the hidden light apparatus illustrated in FIG. 1.
Figure 11:
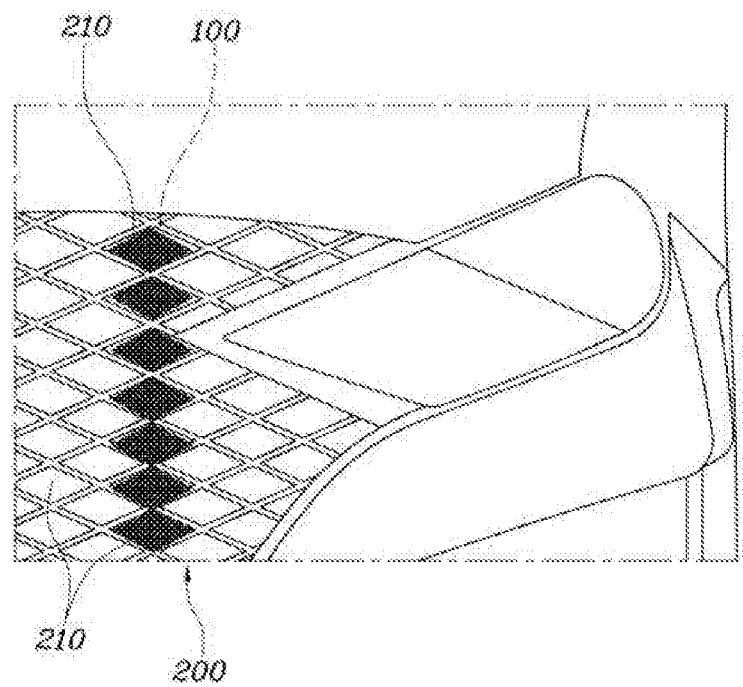

FIG. 1 is a diagram illustrating a hidden light apparatus according to an exemplary embodiment of the present disclosure, FIGS. 2 to 6 are diagrams for explaining the hidden light apparatus illustrated in FIG. 1, FIGS. 7 to 9 are tables showing the result of a light distribution efficiency experiment when an area of a perforated hole is less than 50% of an entire area of a light emitting area, when an area of the perforated hole is 60% or more of the entire area of the light emitting hole, and when the area of the perforated hole is 60% or more in a state positioned at an upper side of the light emitting area, and FIGS. 10 and 11 are diagrams illustrating message transfer through the hidden light apparatus illustrated in FIG. 1.

Figure 2:
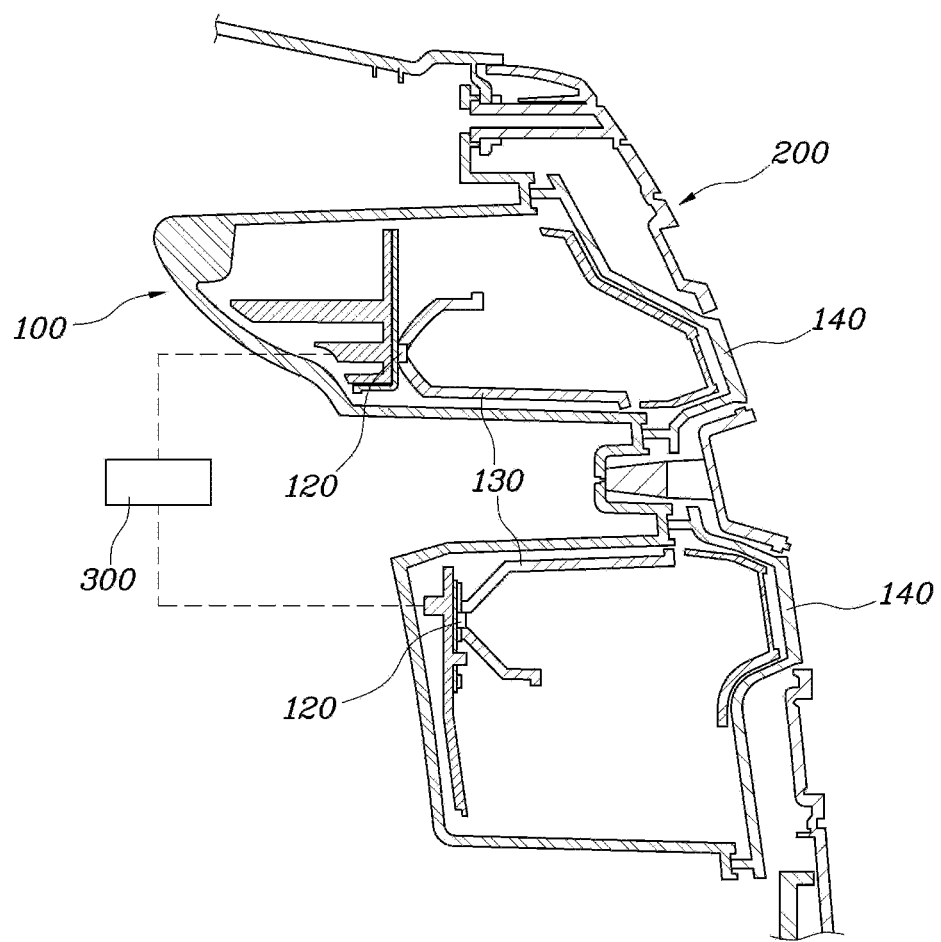
FIGS. 2 to 6 are diagrams for explaining the hidden light apparatus illustrated in FIG. 1.

As illustrated in FIGS. 1 and 2, a hidden light apparatus according to the present disclosure is configured so that an optical module 100 which implements lighting of a vehicle is provided on a grill 200 and the light of the optical module 100 is emitted through the grill 200. As described above, the grill 200 provided in the vehicle is provided with the optical module 100 which emits light, and the light emitted from the optical module 100 is emitted to the outside through the grill 200, so that the light is emitted from the grill 200. That is, when the optical module 100 does not irradiate light, the grill 200 serves as an exterior design according to a pattern shape, and when the optical module 100 emits light, the grill 200 serves as lighting as the light is emitted therefrom.

Particularly, in the present disclosure, the pattern shape of the grill 200 and the shape of an emitting region 110 to which light is emitted from the optical module 100 are formed to be the same as each other. As illustrated in FIG. 1, the pattern shape of the grill 200 and the shape of the emitting region 110 to which light is emitted from the optical module 100 are formed identically, so that the pattern design of the grill 200 is maintained and a sense of difference caused by light irradiation of the optical module 100 is lowered.

That is, the design of the grill 200 may be determined as a pattern of a specific shape is provided on the grill 200. The pattern of the grill 200 is an important factor expressing the entire design of the grill 200, and if the shape of the emitting region 110 does not match the pattern shape of the grill 200 when light is emitted through the optical module 100, the sense of difference occurs and the design of the grill 200 is reduced in quality.

Accordingly, the pattern shape of the grill 200 and the shape of the emitting region 110 of the optical module 100 are formed to be the same as each other, so that even if light is emitted through the optical module 100, the light is emitted in the same shape as the pattern shape of the grill 200, thereby maintaining the design of the grill 200 and improving aesthetics.

The grill 200 is formed with a plurality of grid panels 210 having the same pattern shapes, and the optical module 100 may be provided on some grid panels 210 or all grid panels 210 among the plurality of grid panels 210. As illustrated in FIG. 1, the grill 200 is formed with the plurality of grid panels 210, and all of the grid panels 210 may be formed to have the same shapes. The shape of the grid panel 210 may be applied in various forms such as a polygon and a circle.

The grid panel 210 of the grill 200 may be provided with the optical module 100 to allow light to be emitted from the grid panel 210 when the optical module 100 irradiates light. That is, in the case of the grid panel 210 in which the optical module 100 is provided, the plurality of grid panels 210 forming the grill 200 are configured so that light of the optical module 100 may be emitted, and in the case of the grid panel 210 on which the optical module 100 is not provided, the plurality of grid panels 210 maintain their own designs. Accordingly, the design of the grill 200 may be diversified by emitting light from the optical module 100 according to the number and locations of grip panels 210 among the plurality of grid panels 210 on which the optical module 100 is provided.

That is, if the optical modules 100 are provided on all of the grid panels 210 of the grill 200, light may be emitted from the entire area of the grill 200, thereby securing the amount of light and intuitively implementing the lighting function. Meanwhile, if the optical module 100 is provided on some grid panels 210 of the grill 200, light may be emitted from some areas of the grill 200, thereby improving the design sensitivity by emitting light from some areas of the grill 200. As an exemplar)/embodiment, as illustrated in FIG. 1, a bent shape such as a '<' shape may be implemented, and the design may be variously implemented by selectively providing the optical module 100 on the plurality of grid panels 210 and emitting light from the optical module 100.

The present disclosure may form the pattern shape of the grill 200 and the shape of the emitting region 110 of the optical module 100 in rhombus shapes. As described above, by matching the pattern shape of the grill 200 with the shape of the emitting region 110 in rhombus shapes, a linear design may be implemented to intuitively recognize the pattern of the grill 200 when the grill 200 is viewed from the outside. In addition, the pattern image of the grill 200 may be linearly implemented, so that it is possible to irradiate light from the optical module 100 through the grill 200, thereby intuitively recognizing the corresponding message when the message is transferred.

Figure 3:
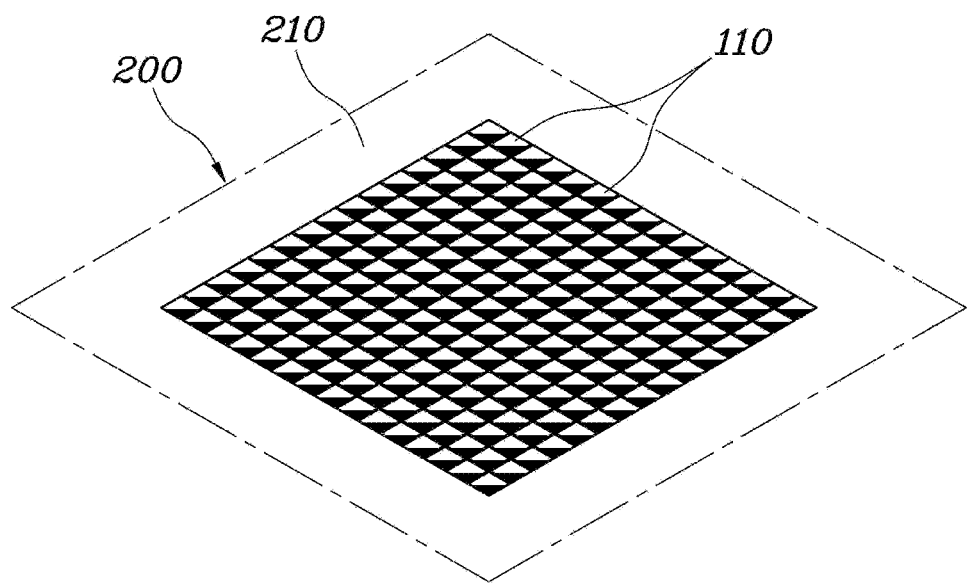

Meanwhile, as illustrated in FIGS. 1 and 3, the optical module 100 which implements the lighting of the vehicle is provided on the grill 200, the grid panel 210 is composed of the plurality of emitting regions 110 forming a grid shape, the light of the optical module 100 is emitted to the outside through a perforated hole 111 formed in the emitting region 110, the total area of the perforated hole 111 may be formed to exceed at least ½ of the total area of the emitting region 110. That is, the grill 200 provided in the vehicle is provided with the optical module 100 which emits light, and the light emitted from the optical module 100 is emitted to the outside through the grill 200, so that the light is emitted from the grill 200.

The light of the optical module 100 is emitted to the outside through the perforated hole 111 formed in the emitting region 110. The perforated hole 111 is a portion which is opened to allow light to be emitted from the inside of the grill 200 to the outside thereof, and the light emitted from the optical module 100 may be emitted to the outside through the perforated hole 111, thereby implementing the light irradiation from the grill 200.

That is, the emitting region 110 of the optical module 100 is a region where the light of the optical module 100 is moved, and if the area of the perforated hole 111 is increased in the total area of the emitting region 110, the amount of light transmitted is increased, and if the area of the perforated hole 111 is decreased, the amount of light transmitted is decreased. However, as the area of the perforated hole 111 is increased in the total area of the emitting region 110, the inside of the grill 200 is visible more specifically from the outside, so that if the perforated hole 111 is excessively large, the design of the grill 200 is deteriorated.

Accordingly, the total area of the perforated hole 111 is formed to exceed at least ½ of the total area of the emitting region 110, thereby securing the transmittance of light emitted from the optical module 100, and preventing the design of the grill 200 from being deteriorated by allowing the inside of the grill 200 to be invisible from the outside.

Here, the perforated hole 111 is preferably set as 60% or more of the total area of the emitting region 110. Even if the perforated hole 111 has 50% or more of the total area of the emitting region 110, light transmittance may be secured through the optical module 100 to some extent, but since the transmittance may be lowered by other processes including painting the perforate hole 111 is set as 60% or more.

This is a result derived through a light distribution efficiency test according to each coordinate, and the light distribution efficiency test is to confirm a luminosity measurement value (light distribution, [cd]) according to each angle (H-horizontal line, V-vertical line) on a screen. As an example, the indicator of the light distribution efficiency test may confirm the luminosity measurement value which satisfies a DRL lamp regulation, and confirm whether the luminosity measurement value according to each coordinate on a 25M distance screen satisfies the DRL lamp regulation. In the results of the light distribution efficiency test illustrated in FIGS. 7 to 9, an HV point is an optical center point and the light distribution is satisfied only when 400 cd to 1200 cd are satisfied, U is Up, D is down, L is Left, and R is Right, and the light distribution satisfaction for each coordinate may be checked. For example, '10U-5L' is a location coordinate which is spaced by 10° upward and 5° leftward from the reference point, and by confirming whether the luminosity measurement value of the corresponding location satisfies a minimum target value of 80 cd and a maximum target value of 1200 cd, it is possible to confirm whether the light distribution efficiency is satisfied.

As a result of the light distribution efficiency test, if the perforated hole 111 is less than 50% of the total area of the emitting region 110, as illustrated in FIG. 7, it may be seen that some points among the plurality of points for the emitting region are not satisfied, and it may also be seen that even at the remaining points, the luminosity measurement value is secured only at a satisfactory level.

However, as illustrated in FIG. 8, if the perforated hole 111 is 60% or more of the total area of the emitting region 110, it may be seen that the luminosity measurement value is satisfied for all points.

In addition, if the perforated hole 111 is 60% or more in a state of being located above the emitting region 110, as illustrated in FIG. 9, it may be seen that the luminosity measurement value is satisfied for all points and a higher luminosity is secured.

As described above, the area of the perforated hole 111 is preferably set as 60% or more, and a sufficient luminosity may be secured when located at the upper side of the emitting region 110.

Here, the pattern shape of the grill 200 and the shape of the emitting region 110 of the optical module 100 are formed to have the same shapes in rhombus shapes, so that the linear design of the grill 200 may be implemented, thereby intuitively recognizing the pattern of the grill 200 when the grill 200 is viewed from the outside. In addition, the pattern image of the grill 200 may be linearly implemented, so that the light of the optical module 100 is emitted through the grill 200, thereby intuitively recognizing the corresponding message from the outside when the message is transferred.

Figure 4:
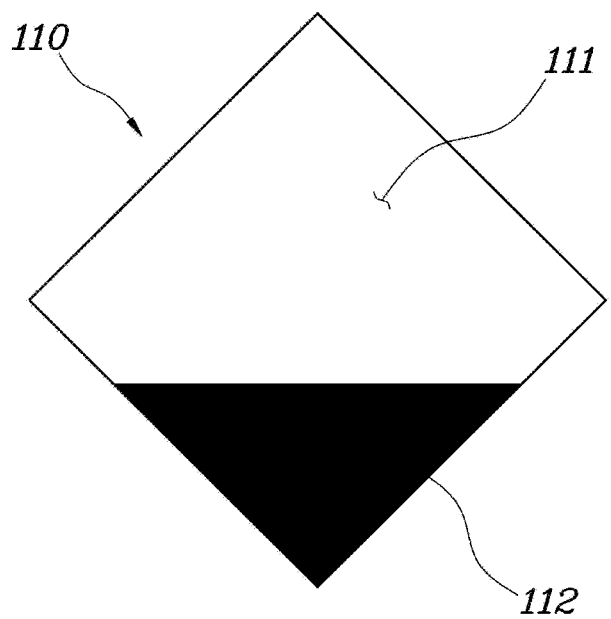

Meanwhile, as illustrated in FIG. 4, the optical module 100 which implements the lighting of the vehicle is provided on the grill 200, the light of the optical module 100 is emitted to the outside through the perforated hole 111 formed in the emitting region 110, the perforated hole 111 is located at the upper side of the emitted region 110, and a non-perforated portion 112 through which light is not transmitted may be formed at the lower side of the emitting region 110. That is, the grill 200 provided in the vehicle is provided with the optical module 100 which emits light, and the light emitted from the optical module 100 is emitted to the outside through the grill 200, so that the light is emitted from the grill 200.

That is, as the emitting region 110 is partitioned into the perforated hole 111 and the non-perforated portion 112, the light emitted from the optical module 100 is emitted to the outside through the perforated hole 111 and the light is not transmitted to the outside through the non-perforated portion 112.

Particularly, as the perforated hole 111 is located at the upper side of the emitting region 110 and the non-perforated portion 112 is located at the lower side of the perforated hole 111, a jewel-like shape may be formed when the grill 200 is viewed from the outside. Specifically, the perforated hole 111 is a portion through which the light of the optical module 100 is transmitted, and when the grill 200 is viewed from the outside, the inside is partially visible through the perforated hole 111. Generally, as the grill 200 of the vehicle is disposed at the lower side of the vehicle, the grill 200 has a shape viewed from the upper side to the lower side when the grill 200 is viewed from the outside, and as the perforated hole 111 is formed at the upper side of the emitting region 110 and the non-perforated portion 112 is formed at the lower side of the emitting region 110, the non-perforated portion 112 is visible through the perforated hole 111 when the grill 200 is viewed from the outside. As described above, the non-perforated portion 112 is visible when the grill 200 is viewed from the outside, and the jewel-like shape may be implemented by the visibility of the residual coating of the non-perforated portion 112, thereby making the exterior design of the grill 200 more appealing. In addition, the perforated hole 111 is disposed at the upper side of the emitting region 110, so that the light of the optical module 100 is emitted to the upper side through the perforated hole 111, thereby improving the visibility of light.

Meanwhile, the perforated hole 111 forms 60% of the total area of the emitting region 110, and the non-perforated portion 112 may be formed in the remainder other than the perforated hole 111. As described above, as the perforated hole 111 is set as 60% or more of the total area of the emitting region 110, even if other processes including painting are performed and the transmittance is lowered, light transmittance may be secured. In addition, as the non-perforated portion 112 is formed in the remaining region other than the perforated hole 111, it is easy to implement the jewel-like shape through the non-perforated portion 112 when the grill 200 is viewed from the outside.

Meanwhile, the pattern shape of the grill 200 and the shape of the emitting region 110 of the optical module 100 are formed identically in rhombus shapes, and the perforated hole 111 may be formed to exceed at least ½ of the total area of the emitting region 110 and thus formed in a pentagonal shape, and the non-perforated portion 112 may be formed in a triangular shape according to the remaining area of the emitting region 110.

As described above, the pattern shape of the grill 200 and the shape of the emitting region 110 of the optical module 100 are formed to have the same shapes in rhombus shapes, so that the linear design of the grill 200 may be implemented, thereby intuitively recognizing the pattern of the grill 200 when the grill 200 is viewed from the outside. In addition, the pattern image of the grill 200 is linearly implemented, so that the light of the optical module 100 may be emitted through the grill 200, thereby intuitively recognizing the corresponding message from the outside when the message is transferred.

In addition, the perforated hole 111 may be formed to exceed at least ½ of the total area of the emitting region 110 and thus formed in a pentagonal shape, and the non-perforated portion 112 may be formed in a triangular shape according to the remaining area of the emitting region 110. That is, the shape of the emitting region 110 of the optical module 100 forms a rhombus shape, and as the perforated hole 111 of the emitting region 110 exceeds at least ½, the perforated hole 111 forms a pentagonal shape. As described above, as the shape of the perforated hole 111 forms a pentagonal shape, the light transmittance may be sufficiently secured in the emitting region 110 having a rhombus shape, and the sense of difference is minimized and it is easy to form a jewel-like design in a situation in which light is not emitted to the lower side of the perforated hole 111 by the non-perforated portion 112 having a triangular shape.

Meanwhile, the optical module 100 which implements the lighting of the vehicle is provided on the grill 200, and the optical module 100 may be composed of a light source portion 120 which emits light, a reflector portion 130 which reflects the light of the light source portion, and a lens portion 140 which forms the emitting region 110 through which the light reflected through the reflector portion 130 is emitted to the outside and is formed to have the same shape as the pattern shape of the grill 200.

Here, the light source portion 120 may be composed as an LED, and the reflector portion 130 is composed as a mirror and is formed to be bent to change the direction of the light emitted from the light source portion to be moved to the outside. The lens portion 140 is disposed in front of the reflector portion 130 so that light is emitted to the outside, and is formed to have the same shape as the pattern shape of the grill 200, thereby maintaining the pattern design of the grill 200 and lowering the sense of difference according to the light irradiation of the optical module 100.

A plurality of optic portions 144 are formed to protrude outward from the lens portion 140, and each optic portion 144 may be configured to have each emitting region. As described above, as the optic portion 144 protrudes from the lens portion 140, it is possible to implement image enhancement by the reflected light when the grill 200 is viewed from the outside. To this end, each optic portion 144 is preferably disposed to correspond to each emitting region 110, respectively.

Figure 5:
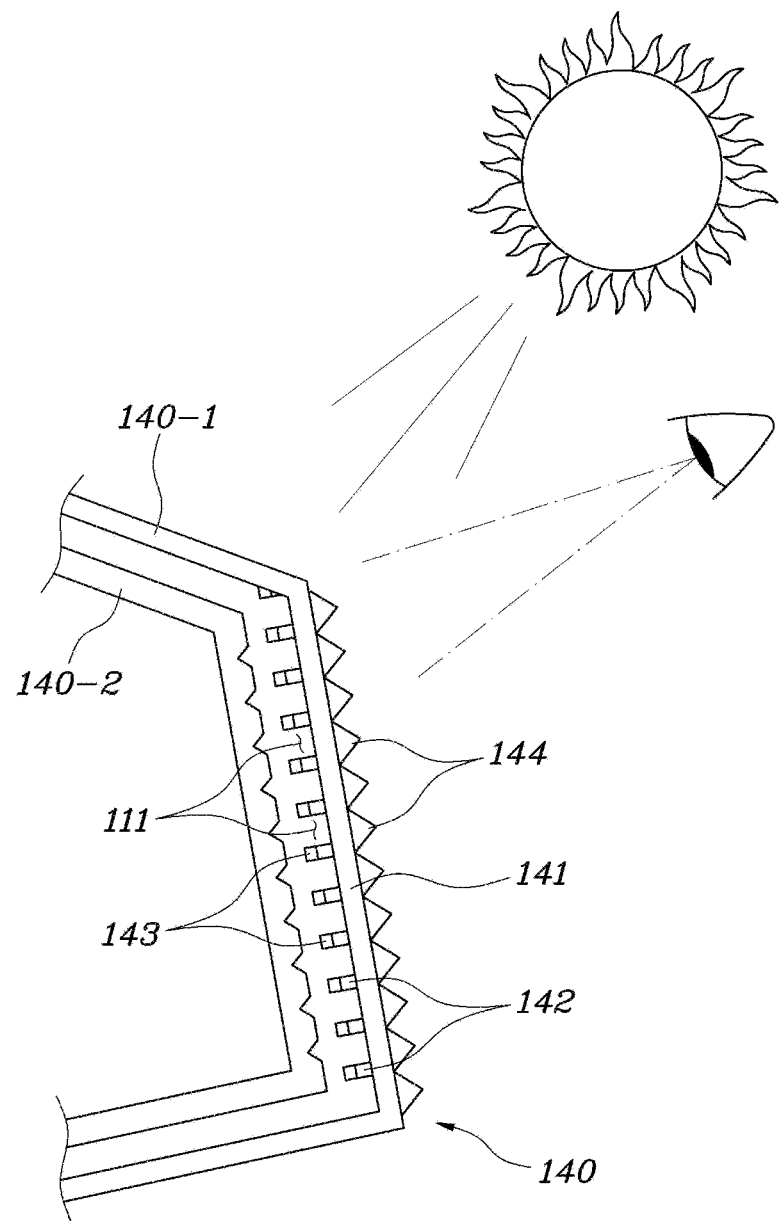
Figure 6:
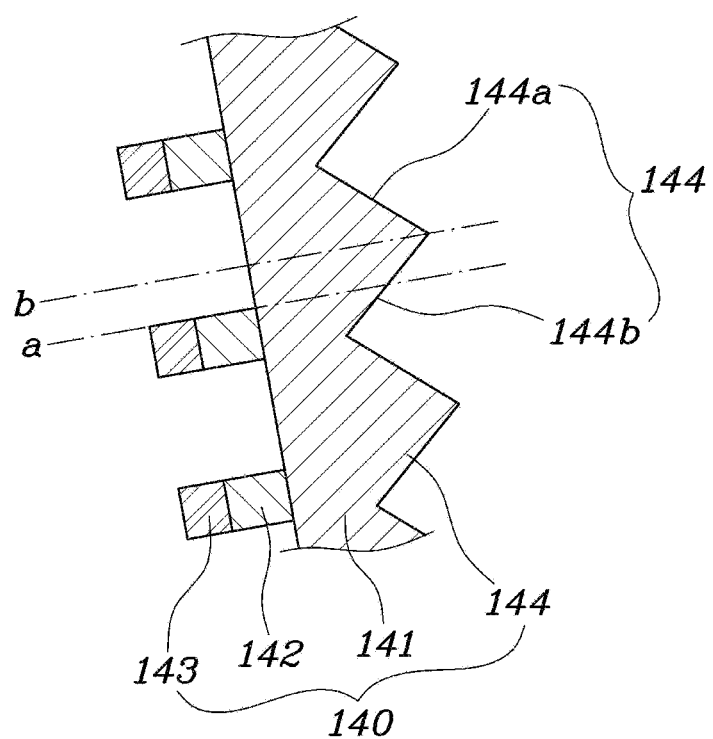

Specifically, as illustrated in FIGS. 5 and 6, the optic portion 144 is composed of an upper surface 144a and a lower surface 144b extending to protrude and be collected at an angle from locations spaced apart from each other, and the emitting region 110 may be composed of the perforated hole 111 through which light is transmitted to the upper side thereof and the non-perforated portion 112 through which light is not transmitted to the lower side thereof.

As described above, the optic portion 144 is composed of the upper surface 144a and the lower surface 144b which are connected with an inclination, so that when the grill 200 is viewed from the outside, as sunlight is reflected to the upper surface 144a and sunlight is not reflected to the lower surface 144b, a difference between the images of the upper surface 144a and the lower surface 144b of the optic portion 144 occurs. In addition, the emitting region 110 has the perforated hole 111 through which light is transmitted formed in the upper side thereof and the non-perforated portion 112 through which light is not transmitted formed at the lower side thereof, so that the non-perforated portion 112 is visible when the grill 200 is viewed from the outside, thereby implementing a jewel-like shape.

To this end, the optic portion 144 is formed so that the upper surface 144a and the lower surface 144b extend to be collected at the same angle, and the emitting region 110 may be formed so that a point (a) at which the perforated hole 111 and the non-perforated portion 112 are branched is disposed below a connecting point (b) between the upper surface 144a and the lower surface 144b. Accordingly, the perforated hole 111 may be formed to exceed at least ½ of the total area of the emitting region 110.

That is, the optic portion 144 forms an isosceles triangle shape as the upper surface 144a and the lower surface 144b extend at the same angle, and the emitting region 110 is formed so that the point (a) at which the perforated hole 111 and the non-perforated portion 112 are branched is disposed below the connecting point (b) between the upper surface 144a and the lower surface 144b, thereby securing the visibility of the non-perforated portion 112 through the perforated hole 111 when the grill 200 is viewed from the outside.

In particular, as the grill 200 of the vehicle is generally disposed at the lower side of the vehicle, the grill 200 has a shape of being viewed from the upper side to the lower side when the grill 200 is viewed from the outside. As described above, when the grill 200 of the vehicle is viewed from the outside, sunlight is reflected to the upper surface 144a of the optic portion 144 formed on the lens portion 140 and sunlight is not reflected to the lower surface 144b, so that the design according to a difference between the reflected images of the upper surface 144a and the lower surface 144b is implemented, and the non-perforated portion 112 is viewed through the perforated hole 111 when the interior of the grill 200 is viewed through the upper surface 144a of the optic portion 144, thereby implementing a jewel-like shape due to the visibility of the remaining coating of the non-perforated portion 112. Accordingly, the exterior design of the grill 200 is made more appealing. In addition, the emitting region 110 is formed so that the point (a) at which the perforated hole 111 and the non-perforated portion 112 are branched is disposed below the connecting point (b) between the upper surface 144a and the lower surface 144b, thereby increasing the area of the perforated hole 111 to secure the light transmittance of the optical module 100 during the lighting function.

Meanwhile, the shape of the optic portion 144 may have the same shape as the pattern shape of the grill 200. As described above, the shape of the optic portion 144 is formed to have the same shape as the pattern shape of the grill 200, so that the pattern design of the grill 200 is maintained and the sense of difference caused by the light irradiation of the optical module 100 is lowered. As described above, the pattern shape of the optic portion 144 may be formed to have the same shapes as each other, thereby maintaining the design shape according to the design, and the light is emitted in the same shape as the pattern shape of the grill 200 even if the light is emitted through the optical module 100, thereby maintaining the design of the grill 200 and improving aesthetics.

Particularly, the pattern shape of the grill 200, the shape of the lens portion 140, the shape of the emitting region 110, and the shape of the optic portion 140 may be formed to have the same shapes in rhombus shapes. As described above, the linear design is implemented by matching all of the shape of the optic portion 140, the pattern shape of the grill 200, the shape of the emitting region 110, and the shape of the lens portion 140 in rhombus shapes, thereby intuitively recognizing the pattern of the grill 200 when the grill 200 is viewed from the outside. In addition, as the shape of the optic portion 140 is also matched to the rhombus shape, the design according to the rhombus shape may be clearly expressed, when the grill 200 is viewed. As described above, the pattern image of the grill 200 may be linearly implemented, thereby intuitively recognizing the corresponding message when the message is transferred by emitting light of the optical module 100 through the grill 200.

Meanwhile, the lens portion 140 includes a transmissive layer 141 which is disposed at the outside and configured to transmit light, a reflective layer 142 which is coupled to the inside of the transmissive layer 141 and configured to reflect light, and a painting layer 143 which is coupled to the inside of the reflective layer 142 and has a low light transmittance compared to the transmissive layer 141, and the reflective layer 142 and the painting layer 143 may be formed with the plurality of perforated holes 111 opened to the transmissive layer 141 to be spaced apart from each other at the same locations, thereby forming the plurality of emitting regions 110.

As described above, the lens portion 140 is composed of the transmissive layer 141, the reflective layer 142, and the painting layer 143. Here, the transmissive layer 141 preferably is made of a plastic material which is a transparent material, the reflective layer 142 preferably is made of a material capable of reflecting light and formed to be coated on the transmissive layer 141, and the painting layer 143 preferably is applied to the reflective layer 142 with a material having a low light transmission. Preferably, the reflective layer 142 and the painting layer 143 are made of the same material as the grill 200, and may form the same appearance as the grill 200. That is, when the grill 200 is viewed from the outside, a jewel-like shape is formed as the reflective layer 142 is visible through the transmissive layer 141, and the inside is invisible by the reflective layer 142 and the painting layer 143.

Particularly, the reflective layer 142 and the painting layer 143 may be formed with the plurality of perforated holes 111 opened to the transmissive layer 141 to be spaced apart from each other at the same locations, thereby forming the plurality of emitting regions 110. That is, the light emitted from the optical module 100 may pass through the transmissive layer 141 through the plurality of perforated holes 111 formed in the reflective layer 142 and the painting layer 143 to be emitted to the outside. The perforated hole 111 is a portion opened to allow the light emitted from the optical module 100 to be emitted to the outside, and may be formed at the same location between the reflective layer 142 and the painting layer 143 and opened to the transmissive layer 141, so that the light may be emitted to the outside through the reflective layer 142 and the paining layer 143.

As described above, the lens portion 140 according to the present disclosure has the same appearance as the grill 200 through the transmissive layer 141, the reflective layer 142, and the painting layer 143, and the reflective layer 142 and the painting layer 143 are formed with the perforated hole 111, so that the light emitted from the optical module 100 may be emitted to the outside through the perforated hole 111, thereby implementing the lighting function.

In addition, the lens portion 140 may be composed of an outer lens 140-1 which is composed of the transmissive layer 141, the reflective layer 142, and the paining layer 143, and an inner lens 140-2 which is disposed inside the outer lens 140-1 and formed with a plurality of protrusions or grooves to scatter the light emitted from the optical module 100.

As described above, the lens portion 140 is composed of the outer lens 140-1 and the inner lens 140-2: the outer lens 140-1 forms the same appearance as the grill 200, and the inner lens 140-2 is configured to scatter the light emitted from the optical module 100. Here, the inner lens 140-2 is disposed inside the outer lens 140-1 and formed with the plurality of protrusions or grooves, so that the light emitted from the optical module 100 is scattered by the plurality of protrusions or grooves, thereby removing hot spots and improving visibility of light.

Meanwhile, FIGS. 10 and 11 are diagrams illustrating a message transfer through the hidden light apparatus illustrated in FIG. 1, and the optical module 100 which implements the lighting of the vehicle is provided on the grill 200 to emit the light of the optical module 100 through the grill 200, and a plurality of optical modules 100 may be configured on the grill 200 so that the optical module 100 may be individually turned on/off. Through the individual turn-on/off control of the optical module 100, by diversifying the location of light emitted from the grill 200, the intensity of light, and the like, it is possible to implement various lighting functions.

Specifically, the hidden light apparatus further includes a controller 300 which individually controls the turn-on/off of the optical module 100, and the controller 300 may perform a sequential lighting control of sequentially turning on/off the plurality of optical modules 100 and an image implementation control for the message transfer by turning on/off only some of the optical modules. Here, the controller 300 may control the turn-on/off of the optical module 100 by receiving a user's operation or various sensor signals, and perform the sequential lighting control for the plurality of optical module 100 configured on the grill 200 from one side to the other side or from the other side to one side, thereby implementing the advanced lighting design and transferring the directionality according to the situation to other vehicles or pedestrians. In addition, the controller 300 may implement a message such as a text or a figure by turning on/off only some of the optical modules 100, thereby conducting communication by transferring various messages.

The hidden light apparatus having the aforementioned structure is configured so that light is emitted from the grill 200 of the vehicle in a same appearance as a shape of the grill 200 when light is not emitted, thereby maintaining the design of the grill 200.

While the specific exemplar)/embodiments of the present disclosure have been illustrated and described, it will be apparent to those skilled in the art that various improvements and changes of the present disclosure are possible without departing from the technical spirit of the present disclosure provided by the appended claims.

What is claimed is:

1. A hidden light apparatus for a vehicle, comprising:
   a grill which has an outer surface formed of a pattern composed of a plurality of grids;
   a grid panel which is coupled to one of the grids in a same shape to form a surface of the one grid, configured on some or all of the plurality of grids, and formed with a perforated hole of a region opened to an inside and an outside and a non-perforated portion which is a region not opened; and
   an optical module which is provided inside the grid panel, allows the grid panel to configure the pattern of the grill when turned off, and allows the grid panel to serve as lighting of a vehicle by emitting light through the perforated hole of the grid panel when turned on.

2. The hidden light apparatus according to claim 1, wherein the grill is composed of a plurality of grid panels having the same pattern shapes, and
   wherein optical modules are provided on some of the grid panels or all of the grid panels among the plurality of grid panels, respectively.

3. The hidden light apparatus according to claim 1, wherein the grid panel is composed of a plurality of emitting regions forming grid shapes.

4. The hidden light apparatus according to claim 1, wherein the pattern of the grill and a shape of an emitting region of the optical module are rhombus shapes.

5. The hidden light apparatus according to claim 4, wherein the grid panel is composed of a plurality of emitting regions forming grid shapes, and the emitting regions are each composed of the perforated hole and the non-perforated portion.

6. The hidden light apparatus according to claim 4, wherein light of the optical module is emitted to outside through the perforated hole formed in the emitting region, and a total area of the perforated hole is formed to exceed at least ½ of a total area of the emitting region.

7. The hidden light apparatus according to claim 6, wherein the perforated hole is 60% or more of the total area of the emitting region.

8. The hidden light apparatus according to claim 4, wherein the perforated hole is located at an upper side of the emitting region, and the non-perforated portion through which light is not transmitted is formed at a lower side of the emitting region.

9. The hidden light apparatus according to claim 1, wherein the pattern of the grill and a shape of the emitting region of the optical module are rhombus shapes, the perforated hole is formed in a pentagonal shape by being formed to exceed at least ½ of a total area of the emitting region, and the non-perforated portion is formed in a triangular shape according to a remaining area of the emitting region.

10. The hidden light apparatus according to claim 1, wherein the optical module is composed of a light source portion which emits light, a reflector portion which reflects light of the light source portion, and a lens portion which forms an emitting region through which the light reflected through the reflector portion is emitted to the outside and is formed to have the same shape as the pattern shape of the grill.

11. The hidden light apparatus according to claim 1, wherein a plurality of optical modules are provided on the grill, and configured to be turned on/off individually.

* * * * *